United States Patent [19]

Cripe et al.

[11] 3,893,379
[45] July 8, 1975

[54] PUSH ROD BEARING AND SEAL MEANS

[75] Inventors: Maxwell L. Cripe; Richard H. Rosback, both of South Bend, Ind.

[73] Assignee: The Bendix Corporation, South Bend, Ind.

[22] Filed: Mar. 1, 1974

[21] Appl. No.: 447,459

[52] U.S. Cl. ................... 92/94; 92/168; 277/103; 208/3.5; 60/547
[51] Int. Cl. ...... F16j 15/18; F01b 19/00; F16j 3/00
[58] Field of Search ............ 92/168, 165, 167, 94; 91/369, 369 B, 369 R; 60/557, 558; 277/103; 308/3.5

[56] References Cited
UNITED STATES PATENTS

| | | | |
|---|---|---|---|
| 2,790,306 | 4/1957 | Ingres | 91/369 B |
| 2,867,193 | 1/1959 | Ayers, Jr. | 91/369 B |
| 3,172,334 | 3/1965 | Wuellner et al. | 92/168 |
| 3,259,146 | 7/1966 | Hager | 60/558 |
| 3,434,285 | 3/1969 | Hager | 60/557 |
| 3,777,496 | 12/1973 | Mizusawa | 60/557 |

*Primary Examiner*—Paul E. Maslousky
*Attorney, Agent, or Firm*—Leo H. McCormick, Jr.; William N. Antonis

[57] ABSTRACT

A bearing and seal combination for use in pressurizing section of a servomotor which supplies hydraulic fluid under pressure to a braking system. The bearing and seal combination will align and permit a push rod to move a piston in response to a pressure differential being created across a movable wall. The bearing and seal combination will prevent air from being communicated into the pressurizing section during a first condition and fluid under pressure from escaping from the pressurizing chamber during a second condition.

5 Claims, 3 Drawing Figures

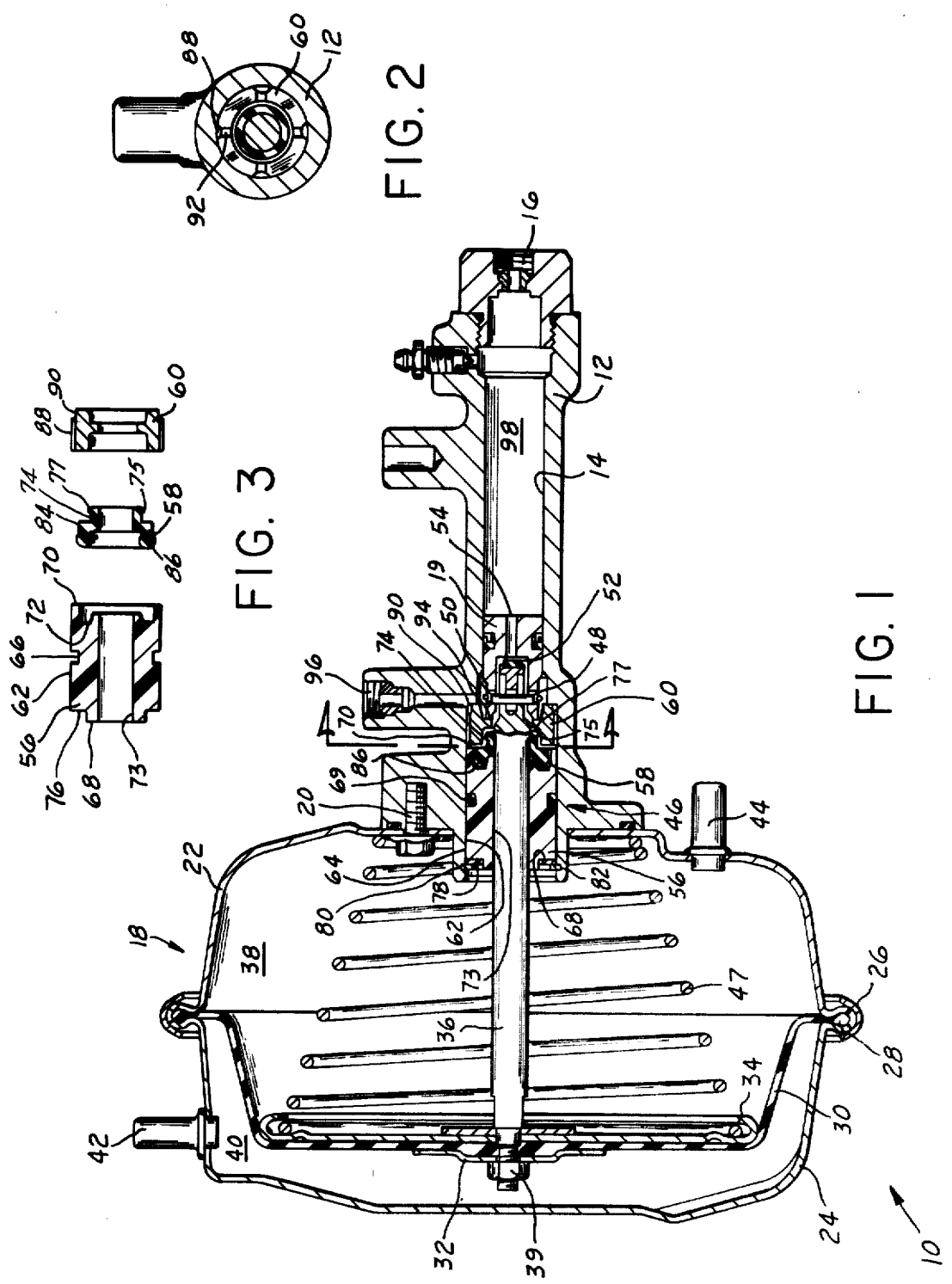

PUSH ROD BEARING AND SEAL MEANS

BACKGROUND OF THE INVENTION

In servomotors such as that disclosed in U.S. Pat. No. 3,113,806, cup seals are positioned adjacent a guide bearing of an actuated input push rod to prevent the loss of fluid from the pressure chamber into a force producing chamber. The cup seals are held against the guide bearing by a retainer which expands an inner and outer lip into contact with an annular axial shoulder on the bearing and the push rod. In order that the piston can effectively produce a sufficient operational fluid pressure, it is essential that all the air must be removed from the hydraulic system. Normally, air is removed from the hydraulic system by applying a vacuum to the hydraulic supply line. In an effort to remove all the air from the hydraulic supply line, a vacuum level of below 16 inches Hg is most effective. However, we have found that about 16 inches Hg air can enter the force producing chamber by passing between the cup seal and the push rod. In an effort to provide a more effective seal against air from entering into the pressure chamber, an angular coil spring was placed on the inner lip of the cup seal. Unfortunately, these springs greatly increased the cost of the bearing seal combination; in addition, this type of coil spring had a tendency to easily break or become distorted thereby eliminating any aid in sealing.

SUMMARY OF THE INVENTION

We have invented a bearing and seal means for maintaining a push rod in alignment with a piston in a pressurizing chamber and a movable wall in a power producing chamber. The bearing and seal means has a cylindrical member with a first groove in its peripheral surface and a second groove on one end thereof. The second groove is concentric to an axial bore through which the push rod is reciprocated. The push rod will move the piston in response to movement by the wall means. A first resilient means is located in the first groove to prevent communication of air from the power producing chamber and fluid under pressure in the pressurizing chamber from being communicated along the peripheral surface of the cylindrical member. A second resilient means has a first projection extending from a disc section into the second groove and a second projection extending along the push rod into a tubular spacer means. A rib on the end of the second projection will provide a tight interference fit with the push rod to prevent air and fluid under pressure from being communicated along the push rod. The tubular spacer has a plurality of slots along its periphery which are matched with vertical slots on one end. The other end has a groove on the periphery through which the fluid under pressure can enter the plurality of slots and be communicated with the interior of the tubular spacer to act on the second projection and aid in establishing the tight interference fit with the push rod. A stop on the interior of the tubular spacer adjacent the rib on the second projection will engage the piston in the pressurizing chamber to limit the distance a return spring can position the movable wall in the power producing chamber. A keeper means located in the housing of the pressurizing chamber will maintain the cylindrical member and tubular spacer in a stationary position within the pressurizing chamber.

It is therefore the object of this invention to provide a servomotor with a bearing and seal combination which will prevent the intercommunication of air and fluid between a power chamber and a pressurizing chamber.

It is another object of this invention to provide a bearing and seal combination for a servomotor wherein air and fluid under pressure is prevented from being communicated between a power chamber and a pressure chamber by a first resilient means located on the periphery of a cylindrical member and by a second resilient means fixed to the end of the cylindrical member. The second resilient means has a rib on the end thereof which provides an interference fit with a push rod to permit movement and yet assure a tight seal.

BRIEF DESCRIPTION OF THE DRAWINGS

FIG. 1 is a sectional view of a servomotor having a bearing and seal combination located therein to assure complete separation of the power chamber and the fluid chamber.

FIG. 2 is a sectional view taken along line 2—2 of FIG. 1.

FIG. 3 is an exploded sectional view of the bearing and seal combination shown in FIG. 1.

The hydraulic pressurizing servomotor 10 shown in FIG. 1 has a cylindrical housing 12 with an axial bore 14 therein from which fluid under pressure is presented to a brake system through an outlet 16. The cylindrical housing 12 is attached to a front shell 22 of a pressure differential motor 18 by a plurality of bolts 20.

The pressure differential motor 18 has a rear shell 24 attached to the front shell 22 by a band 26 which holds bead 28 of the diaphragm 30. The diaphragm 30 is sandwiched between a first backing plate 32 and a second backing plate 34. The first and second backing plates 32 and 34 are secured to a push rod 36 by a nut 39. The diaphragm 30 separates the interior of the pressure differential motor 18 into a vacuum chamber 38 and a control chamber 40. A port 42 in the control chamber 40 is connected to a control valve as disclosed in U.S. Pat. No. 3,572,376 for communicating a fluid in response to an operational signal. The front chamber 38 has a port 44 which is connected to a vacuum chamber in the control valve to permit return spring 47 to move the movable wall or diaphragm 30 toward the rear shell 24. The push rod 36 which extends through a bearing and seal means 46 is attached to piston 19 by a pin 48. Pin 48 is free to move in slot 50 to correspondingly seat face 52 on the housing surrounding the compensating port 54.

The bearing and seal means combination 46 consists of a cylindrical member 56, a resilient seal 58 and a tubular spacer 60, as best shown in FIG. 3.

The cylindrical member 56 has a peripheral surface 62 with a diameter substantially the same as the first portion 64 of the bore 14. A first groove 66 is located approximately midway between a first end 68 and a second end 70 of the cylindrical member 56. A resilient O-ring seal 69 is located in the first groove 66. A second groove 72 located on the second end 70 of the cylindrical member is concentric to the axial bore 73 in which the push rod 36 is aligned. An end groove 76 is located on the first end 68 of the cylindrical body to provide a ledge for holding a washer 78 which engages keeper means 80. The keeper means 80 will normally consist of a snap ring which is placed in groove 82 in the housing 12.

The resilient seal 58 consists of a disc section 84 from which a first projection 86 extends from a first side into the second groove 72. The first projection 86 has a bulbous end to provide a continuous seal with the entire surface of the second groove 72. A second axial annular projection 74 extends from a second side into the interior of the tubular spacer means 60. A rib 75 is located on the end 77 of the second axial annular projection to bias the axial annular projection 74 into an interference fit with the push rod 36.

The tubular spacer means 60 has a plurality of axial slots 88 on its external surface which connect groove 90 with a plurality of vertical slots 92 on the end thereof adjacent the end 70 of the cylindrical member 56 and the second side of the resilient disc 84. The interior of the tubular spacer means 60 has an integral annular stop 94 located thereon. The second axial annular projection 74 extends into the tubular spacer means 60 to a position substantially adjacent the annular stop 94. The stop 94 is adapted to engage the end of piston 18 and transmit the force of spring 46 acting on backing plate 34 and transmitted through pin 48 in the push rod 36 directly into the cylindrical member 56.

MODE OF OPERATION OF THE PREFERRED EMBODIMENT

When the servomotor 10 is installed on a vehicle, outlet port 16 will be connected to the brake lines of the wheel brakes and port 96 will be connected to a supply of hydraulic fluid, usually a master cylinder. Initially, fluid will enter port 96, pass through slot 50 out the compensating port 54 into the pressurizing chamber 98 to completely fill the brake lines. To be assured that no air is present in the hydraulic brake system, a vacuum is attached to the master cylinder. This vacuum will have an intensity below 16 inches Hg which will be less than that available in chamber 38, as a result a pressure differential will exist therebetween with the first portion 64 of the bore. The O-ring seal 69 will prevent air from traveling along the periphery of the cylindrical member 56 and entering the hydraulic system. At the same time, the second axial annular projection 74 of the resilient seal 58 is held tight against the push rod 36 by rib 75 to prevent air from traveling along the axial bore 73 and entering the hydraulic system. When the applied vacuum has removed all the air from the hydraulic system, the servomotor is now capable of being operated.

To apply the brakes of an input force on the master cylinder will develop an actuation hydraulic force which will be transmitted through port 96 into the first section 64 of the bore 14.

This actuation hydraulic force will operate the control valve which will allow air to enter port 42 and develop an operational pressure differential across the diaphragm 30. This pressure differential will act on diaphragm 30 and overcome return spring 47 to move pin 48 in slot 50 and seal compensating port 54. Further movement of the push rod will pressurize the hydraulic fluid in chamber 98 and supply the wheel brakes attached to outlet 16 with a hydraulic force sufficient to develop braking. The actuation hydraulic force will be freely communicated to groove 90 in the spacer means 60 from which it will be transmitted by slots 88 and 92 to act on the second axial annular projection 74 to reinforce the biasing effect of the rib 75 in establishing the interference fit with the push rod 36 and prevent hydraulic fluid from being communicated into chamber 38 by way of the axial bore 73.

Thus, we have provided a bearing and seal means 46 which will substantially eliminate any communication of air and fluid between chamber 38 and the first section 64 of bore 14 to assure an operational effectiveness of the servomotor 10.

We claim:

1. In a servomotor, a bearing and seal means retained in a first section of a bore in a housing for aligning a push rod attached to a movable wall in a power producing chamber with a piston retained in a second section of said bore to prevent air from being communicated from the power chamber into the first section in a first condition and to prevent fluid under pressure present in the first bore from being communicated into the power producing chamber in a second condition, said bearing and seal means comprising:

a cylindrical member having a first end and a second end with an axial bore concentric to the first section, said cylindrical member having a first annular groove on its peripheral surface, and a second annular groove on its second end, said peripheral surface on the cylindrical member substantially matching that of the first section of the housing, said axial bore being adapted to receive said push rod;

first resilient means located in said first annular groove for preventing the occurrence of said first and second conditions along the periphery of said cylindrical member;

second resilient means having a first projection extending from a first side of a disc section and a second projection having a rib on the end thereof, said rib being adapted to bias the second projection into an interference contact with said push rod, said second resilient means preventing the occurrence of the first and second conditions along the axial bore of the cylindrical member;

spacer means located in the first section between the second end of the cylindrical member and a shoulder adjacent the second section of said bore, said spacer means overlying a portion of said disc to rigidly position said first annular projection in the second annular groove; and keeper means secured to said housing for maintaining said cylindrical member and said spacer means in a stationary position within said first section of said bore.

2. In the servomotor, as recited in claim 1, wherein said spacer means includes:

a tubular body having a plurality of axial slots on its external surface, said axial slots connecting a groove on the end thereof adjacent said shoulder in the housing with a corresponding plurality of vertical slots on the end adjacent said cylindrical member and said disc, said groove being in communication with said fluid under pressure, said plurality of axial and vertical slots providing paths through which the fluid under pressure can be transmitted to the interior surface of said tubular body.

3. In the servomotor, as recited in claim 2, wherein said spacer means further includes:

stop means located on the interior surface of said tubular body, said stop means engaging said piston to transmit a resistive force from a return spring in the power chamber acting on the movable wall through the tubular body directly into the cylindrical member without affecting the second seal means.

4. In the servomotor, as recited in claim 3, wherein said rib on the second resilient means is adjacent the stop means on the tubular body of the spacer means, said fluid under pressure acting on the second annular projection to substantially maintain said interference contact with the push rod over the entire annular surface from said second side to the end of the rib to prevent the occurrence of said second condition.

5. In the servomotor, as recited in claim 4, wherein said second resilient means further includes:
   a bulbous section on the first projection for substantially engaging the entire second annular groove to prevent said first and second condition from occurring between the first side of the disc section and the push rod.

* * * * *